United States Patent [19]

Sapyta

[11] Patent Number: 5,575,337
[45] Date of Patent: Nov. 19, 1996

[54] HOOF PICK

[76] Inventor: Rachel T. Sapyta, 15415 Triple Creek, San Antonio, Tex. 78247

[21] Appl. No.: 288,948

[22] Filed: Aug. 11, 1994

[51] Int. Cl.$^6$ .................................................. A01L 15/00
[52] U.S. Cl. ............................................. 168/48.1; 15/237
[58] Field of Search .......................... 168/48.1; 132/329; 433/143; 81/3.55, 3.57; 15/236.07, 237

[56] References Cited

U.S. PATENT DOCUMENTS

| | | | |
|---|---|---|---|
| D. 46,983 | 2/1915 | Holden | 81/3.55 X |
| 632,072 | 8/1899 | Thurber | 168/48.1 X |
| 1,251,321 | 12/1917 | Apted | 15/237 |
| 1,503,610 | 8/1924 | Smith | 433/143 |
| 4,660,557 | 4/1987 | Collis, Jr. | 15/236.07 X |

OTHER PUBLICATIONS

A page from a recent horse products catalog illustrating prior art embodiments of various types of hoof picks. Dates/sources unknown.
A sheet of illustrations taken from recent catalogs, flyers or other advertising brochures for horse-related products illustrating prior art embodiments of various types of hoof picks. Dates/sources unknown.

Primary Examiner—Robert P. Swiatek
Attorney, Agent, or Firm—Gunn, Lee & Miller, P.C.

[57] ABSTRACT

A horse pick for cleaning foreign matter from the hoof of a horse, the pick having an elongated shank with a wedge-shaped tip, typically forming an acute angle with the longitudinal axis of the shank. On the end of the shank opposite the tip is fastened a handle.

5 Claims, 3 Drawing Sheets

HOOF PICK

FIELD OF THE INVENTION

A hand tool used to clean out horse hooves, more specifically, a hoof pick, that, through design, uses leverage to dislodge the packed in matter.

BACKGROUND OF THE INVENTION

Hand tools used for the removal of foreign matter from the hooves of horses, known in the industry as "hoof picks" or "picks" are well known in the prior art. These hoof picks vary in shape and size but typically use a prying motion to remove the matter or material from the hooves.

To pick a horse's hoof, the user bends over and picks up the horse's hoof in one hand. While still in the bent over position, the user would hold the hoof in one hand and pick out the hoof with the other. In prior art hoof picks, the pick is inserted under the matter or material to be removed. The user rests the heel of their palm on the horse's hoof for stability and leverage, then, using a downward wrist and elbow motion, bears down on the handle of the prior art hoof pick which forces the top of the hoof pick upward. This prying motion forces portions of the debris upward and out the hoof.

Though there are many variations in the size of the prior art hoof picks, the shape of the handle, the manufacturing material, and the general appearance of the hoof pick, one thing remains common in the prior art hoof picks: they typically require the same wrist-straining prying motion in order to function.

Unfortunately, these hoof picks with their prying motion technique leave much to be desired. The main problem occurs when the hoof is hard packed with a substance such as clay-based mud or ice. when this occurs, it is difficult to insert the prior art hoof pick under this type of debris and get the leverage that a user needs in order to pry the material out. The hook end, that is inserted under the debris, is often too short to be inserted far enough under the debris to allow any leverage. The result is that the matter comes out in small pieces, if at all, while requiring back-breaking, wrist-straining work, from the user.

Often, if the debris is hard packed enough, the prying will involve enough force that it will break or bend the pick, to say nothing of the damage to the user's hand and/or wrist. It is common, when using this kind of force with prior art hoof picks, for the portion of the hand that hold the pick handle to become sore due to the uncomfortable design of the handle of the picks, when held with force. It is also common for the heel of the hoof pick holding hand that is resting on the horse's hoof for stability and leverage, to become sore due to the pressure exerted on the hoof. It is also very common for the wrist to become sore from applying the downward pressure needed to pick out the debris. Finally, because removing the hard packed debris is done in such an inefficient manner, it takes a long time, and increases user back soreness due to standing in a bent position and applying force for extended periods of time.

Prior art hoof picks are so poorly designed for this use as to often make them unusable. It is not uncommon for a user to bend a screwdriver or other tool, and use that in adjunct with a hammer, to remove hard packed material.

Finally, it is very easy to lose the hoof picks as they are very small. Prior art hoof picks do not provide a carrying case. Often a user will set the hoof pick down and loose it, or they will put it into their back pocket, which can damage their clothes as well as their person.

What is needed, therefor is a hoof pick that provides mechanical advantage when removing hard packed debris, that does not require a prying or rotating motion of the wrist to remove the debris, that is sturdy enough for hard use, that is comfortable in the user's hand, that is faster to use, and that has a convenient carry pouch for storage.

SUMMARY OF THE INVENTION

These and other objects are provided in a hoof pick having a design that increases leverage to more easily remove foreign matter from the hoof of a horse.

It is a further object of the present invention to provide a hoof pick whose design increases leverage, and whose design does not require a heavy prying motion to remove hard packed debris.

It is a further object of the present invention to provide a hoof pick whose design increases leverage, and hose design does not require a heavy prying motion to remove hard packed debris, and that is sturdy enough for hard use.

It is a further object of the invention to provide a hoof pick whose design increases leverage, and whose design does not require a heavy prying motion to remove hard packed debris, and that is sturdy enough for hard use, and that is comfortable in the user's hand.

It is a further object of the present invention to provide a hoof pick whose design increases leverage, and whose design does not require a heavy prying motion to remove hard packed debris and that is sturdy enough for hard use and that is comfortable in the user's hand, and that removes hard packed debris faster than the prior art picks.

It is a further object of the present invention to provide a hoof pick whose design increases leverage, and whose design does not require a heavy prying motion to remove hard packed debris, and that is sturdy enough for hard use, and that is comfortable in the user's hand, and that removes hard packed debris faster than the prior art picks, and that has a convenient carrying case for use and storage.

DETAILED DESCRIPTION OF THE PREFERRED EMBODIMENT

Figure 1:
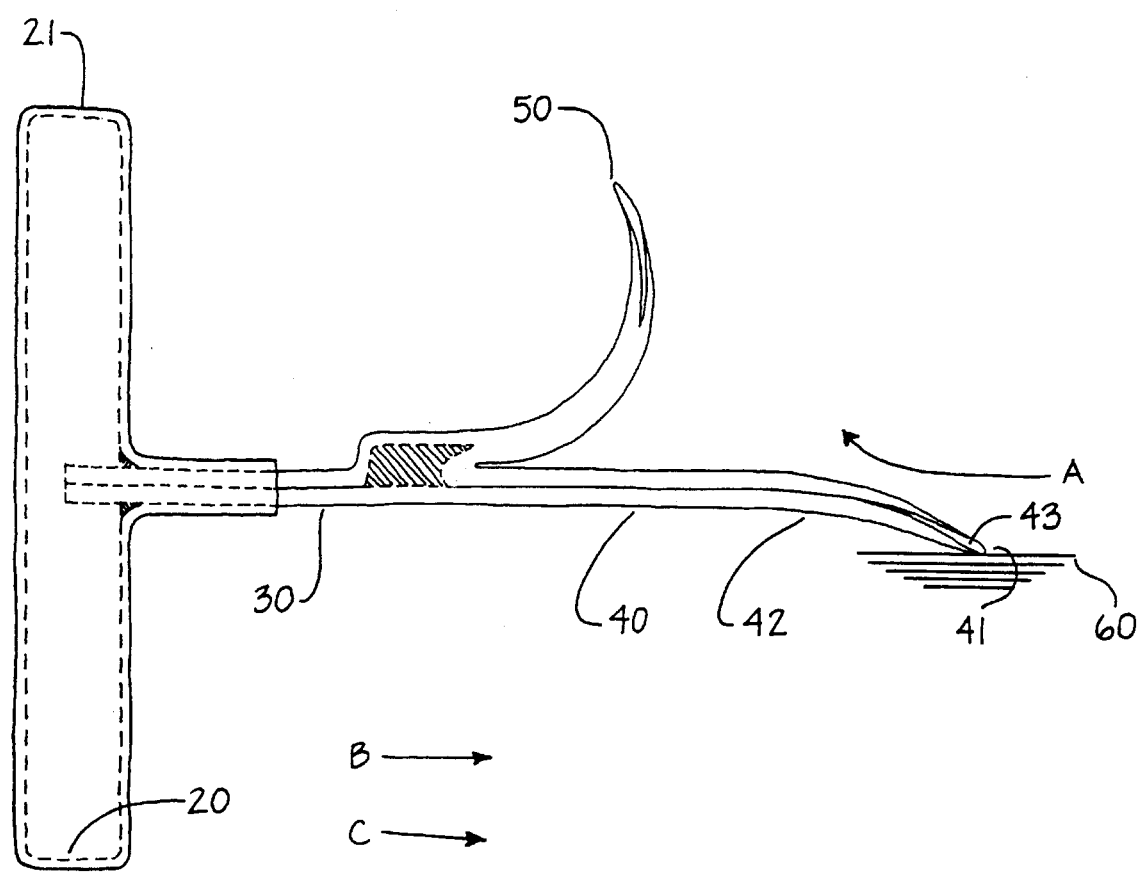
FIG. 1 is a right elevation view of applicant's present invention.
Figure 2:
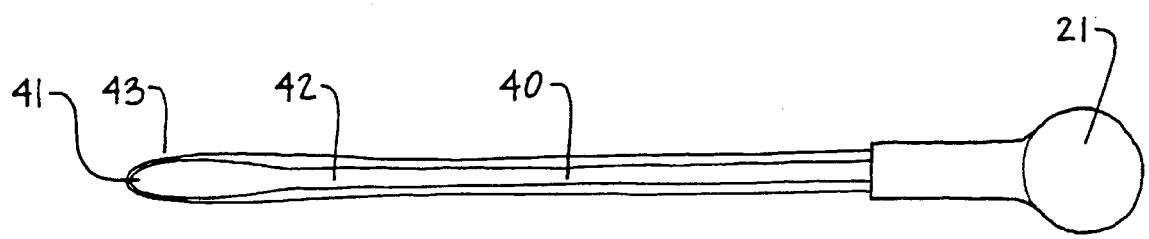
FIG. 2 is a left side elevation view of applicant's present invention.
Figure 3:
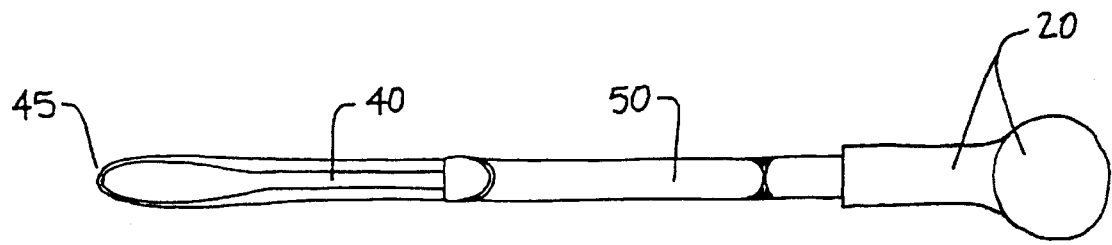
FIG. 3 is a right side elevation view of applicant's present invention.

FIGS. 1–3 illustrate the various features of applicant's present invention. Specifically, FIGS. 1–3 illustrate that applicant's present invention, hoof pick (10) is made up of three main parts: a handle (20), an arm lever (40), and an optional hook portion (50).

Typically, the handle (20) is either a part of, or is permanently connected to the shank (40) at the neck (30). Lever (40) is typically formed from one piece of material, typically metal or hard plastic, while the hook (50) is optional, but if included, is permanently attached to lever (50), by, for example, a weld.

The handle (20) may be of any shape or size, typically T-shaped, and is not limited to the shape and size depicted in FIG. 1. Note from the accompanying drawing how the handle typically has a cylindrical body. The handle (20) is not limited to being in a plane horizontal to the neck as depicted in FIG. 1, as a handle in a vertical plane would still be functional. The handle (20) depicted in FIG. 1, is coated by a rubber coating (21), but the coating is optional and may consist of any other suitable material.

The neck (30) of the pick is where the handle (20) and the body of the shank (40) meet. The body of the shank (40) may also be joined by an optional hook (50).

The lever (40) is an aspect of applicant's invention that distinguishes it from prior art picks. The tip (41) of the pick (10) is located on the removed end of shank (40) and is inserted underneath the debris and against the sole of the hoof (60). The pick (10) is then pushed in a forward motion (B) axially along the longitudinal axis of the body of shank (40) by use of the handle (20). the angled tip (42) of the pick (10) forces the debris up and out along path (A).

For final cleaning, the pick is placed upside down in the hand, and the hook (50) is used to clean out the nooks and crannies of the hoof and the remaining debris.

It is to be appreciated that the use of the downward bent angle tip (42) of the applicant's pick alleviates nearly all the prying motion heretofore necessary in the prior art picks by the user. To increase picking force, the user simply has to apply more pressure to the handle in a forward direction (B) or in a slightly downward forward direction (C). The applicant's invention does not require the user to rest their hand on the horse's hoof, nor does it require any heavy prying by the user's wrist or elbow. All prying motion can be eliminated with proper use of applicant's invention.

It is to be further appreciated that applicant's invention is superior to prior art picks in that, because of the leverage used, the debris usually is removed in one motion and in one piece. This makes the picking process much faster and much easier on the user.

The design of applicant's tip (41) indicates that it is generally wedge-shaped tapering to leading edge (43) and having nose (45), this shape providing ease of insertion into the debris clogging the hoof. The tip (41) makes an angle with respect to the longitudinal axis of the body of shank (40) typically between 10° and 50°, preferably about 20°.

Figure 4B:
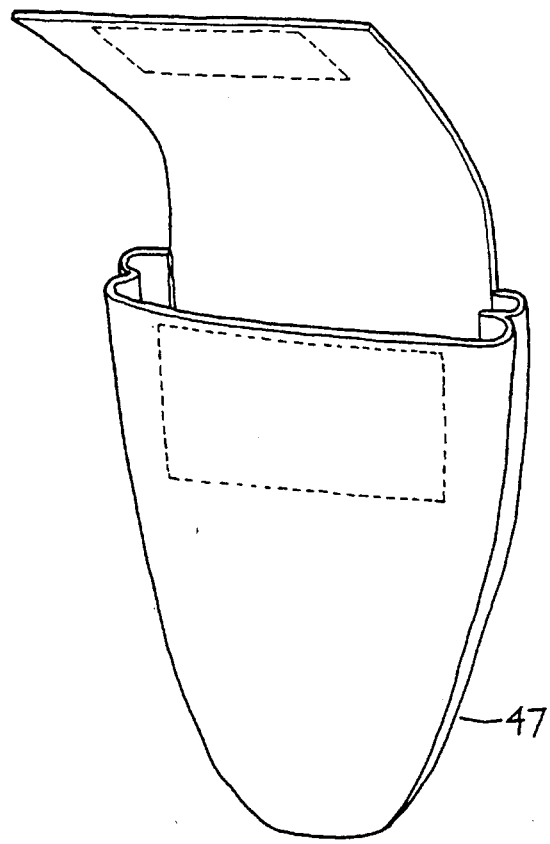
FIGS. 4A and 4B are perspective views of applicant's carrying case.
Figure 4A:
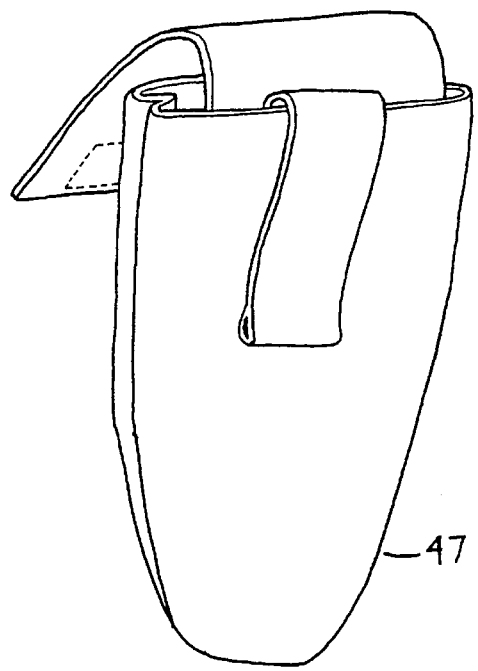

Last, pick (10) is typically provided with a carrying case (47) (see FIGS. 4A and 4B).

Terms such as "left," "right," "up," "down" "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on he contrary, it is intended to cover such alternatives, modifications, and equivalences that may be included in the spirit and scope of the invention as defined by the appended claims.

What is claimed is:

1. An implement for cleaning foreign debris from the hooves of a horse, the implement comprising:

a handle having a longitudinal axis;

a shank having a longitudinal axis perpendicular to the longitudinal axis of said handle having a first end, an elongated body and a second end, the first end engaging said handle and the second end forming a tip, the tip being generally wedge-shaped and forming an angle between the longitudinal axis of the body of said shank and the angle of the tip of greater than 0 degrees and less than 90 degrees; and a hook portion, said hook portion fixedly attached at a first end thereof to the body of said shank between the first end and the second end of the shank, said hook portion having a second end, the second end of said hook portion defining a wedge-shaped member forming a pointed tip; wherein said hook portion may be used to scrape foreign debris, loosened by forcing the tip of said shank into the foreign debris, away from the hoof;

wherein the tip of said shank can be inserted into the debris on the hoof with the concave section of the second end facing the hoof and urged axially along the longitudinal axis of the body of said shank to force the debris off the hoof.

2. The implement of claim 1, wherein said handle is comprised of a cylindrical body having removed ends and is attached to the first end of said shank about midway between the removed ends of the cylindrical body.

3. The implement of claim 2, wherein the interior angle between the longer axis of the body of said shank and the tip is between 10° and 50°.

4. The implement of claim 3, wherein said handle, said hook portion and said shank all lie generally in the same plane.

5. The implement of claim 4, wherein said hook and said shank are comprised of steel and said hook is welded to said shank.

\* \* \* \* \*